(12) United States Patent (10) Patent No.: US 7,956,729 B2
Schmid (45) Date of Patent: Jun. 7, 2011

(54) ELECTRONIC DEVICE

(75) Inventor: Dietmar Schmid, Villmar (DE)

(73) Assignee: Siemens VDO Automotive AG, Regensburg (DE)

( * ) Notice: Subject to any disclaimer, the term of this patent is extended or adjusted under 35 U.S.C. 154(b) by 693 days.

(21) Appl. No.: 11/989,111

(22) PCT Filed: Jul. 3, 2006

(86) PCT No.: PCT/EP2006/063775
§ 371 (c)(1),
(2), (4) Date: Jan. 18, 2008

(87) PCT Pub. No.: WO2007/009867
PCT Pub. Date: Jan. 25, 2007

(65) Prior Publication Data
US 2009/0096594 A1 Apr. 16, 2009

(30) Foreign Application Priority Data

Jul. 21, 2005 (DE) .................. 10 2005 034 161

(51) Int. Cl.
*B60Q 1/00* (2006.01)
(52) U.S. Cl. ............... 340/425.5; 340/286.02; 340/428; 340/438; 340/538.15; 340/538.17
(58) Field of Classification Search ............ 340/310.01, 340/425.5, 428, 438, 506, 508, 538.15, 538.17, 340/310.16, 310.18, 286.02; 307/10.1
See application file for complete search history.

(56) References Cited

U.S. PATENT DOCUMENTS

| | | | |
|---|---|---|---|
| 6,275,752 B1 | 8/2001 | Giers | |
| 2003/0076221 A1* | 4/2003 | Akiyama et al. | 340/310.01 |
| 2005/0240690 A1 | 10/2005 | Schmid | |
| 2006/0282230 A1 | 12/2006 | Morell | |

FOREIGN PATENT DOCUMENTS

| | | |
|---|---|---|
| DE | 197 20 618 | 11/1998 |
| DE | 19720618 A1 | 11/1998 |
| DE | 10 2004 019 874 | 11/2005 |
| DE | 102004019874 | 11/2005 |
| DE | 102004019874 A1 | 11/2005 |
| WO | WO 2005/001380 | 1/2005 |
| WO | WO 2005001380 A1 | 1/2005 |

OTHER PUBLICATIONS

Search Report dated Nov. 14, 2006 for underlying International PCT Application No. PCT/EP2006/063775.
International Search Report dated Nov. 14, 2006 issued in corresponding application No. PCT/EP2006/063775.
German Office Action dated Feb. 9, 2006 issued in corresponding application No. 10 2005 034 161.6.

* cited by examiner

*Primary Examiner* — Daryl Pope
(74) *Attorney, Agent, or Firm* — Cohen Pontani Lieberman & Pavane LLP

(57) ABSTRACT

An electronic device, which for example includes a sensor element such as a rotational speed sensor, comprises a first network (4) having a first microcontroller (8) and a first supply voltage source (10). It also comprises a second network (4) having a second microcontroller (8) and a second supply voltage source (30). The electronic device is also provided with decoupling elements (42-50) which are adapted to decouple the networks (4, 6) form interferences.

5 Claims, 1 Drawing Sheet

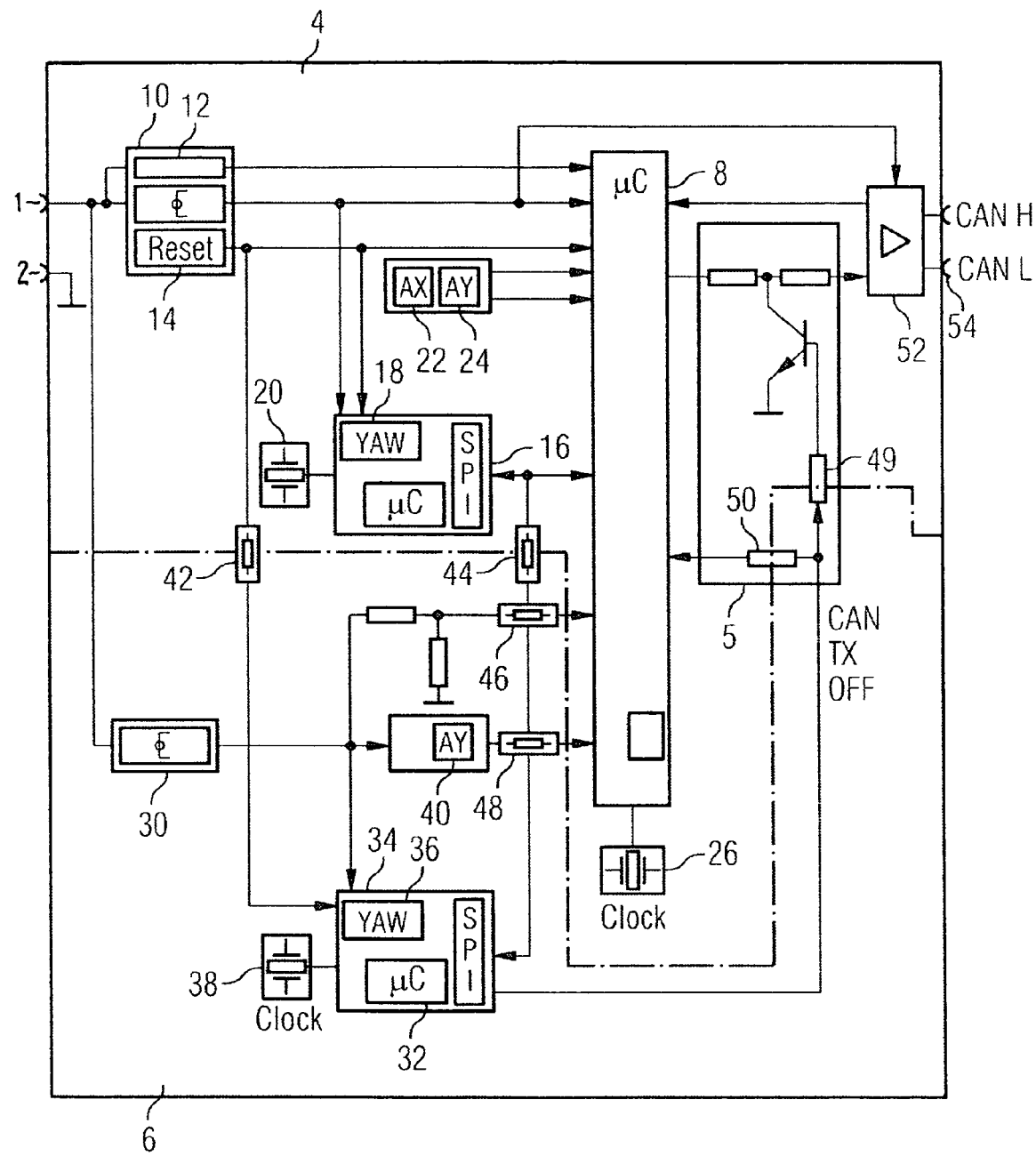

ELECTRONIC DEVICE

CROSS REFERENCE TO THE RELATED APPLICATIONS

This is a U.S. national stage of application No. PCT/EP2006/063775, filed on 3 Jul. 2006. Priority is claimed on the following application: DE 10 2005 034 161.6, filed Jul. 21, 2005, the content of which is incorporated herein by reference.

BACKGROUND OF THE INVENTION

The invention relates to an electronic apparatus which is particularly suitable for use in a motor vehicle.

Electronic apparatuses which comprise, by way of example, a sensor element, such as a rotation rate sensor, are increasingly being used for safety-critical applications in motor vehicles, such as part of a vehicle dynamics control system.

In the case of such safety-critical applications, a particularly high level of importance is attached to reliable and safe operation.

SUMMARY OF THE INVENTION

It is therefore an object of the invention is to provide an electronic apparatus which allows reliable and safe operation.

These and other objects and advantages are achieved by an electronic apparatus which comprises a first network, with a first microcontroller and with a first supply voltage source, and a second network, with a second microcontroller and a second supply voltage source. Decoupling elements are provided which are designed to decouple interfering influences from between the two networks. This makes it a simple matter to reduce the effect of interfering influences, such as overvoltages, on the respective other network such that they cannot have a critical effect on the respective other network. Furthermore, if the electronic apparatus is of suitable design, it is a simple matter to identify overvoltages, for example, in the respective other network, which are caused by faults in the first or second supply voltage source.

In an advantageous embodiment of the electronic apparatus, the decoupling elements are resistors. This is effective in particularly simple and simultaneous fashion. Here, the decoupling elements can be designed particularly easily by simulations or other calculations. As a result, a maximum interfering influence, for example, a maximum overvoltage in the respective other network, reliably causes no damage.

In another advantageous embodiment of the electronic apparatus, the second microcontroller is integrated on a chip with a sensor element and is designed or configured to process a measurement signal from the sensor element. This has the advantage that the second microcontroller can thus have a dual function, specifically is firstly designed to process the measurement signal from the sensor element and can secondly simultaneously be used to detect errors in the respective first network.

In another advantageous embodiment of the invention, the first network has an associated first sensor element. The sensor element which is integrated with the second microcontroller on a chip is a second sensor element, which is provides redundancy for the first sensor element. It is thus possible to ensure a very high level of safety through the redundancy of the sensor element and of the likewise redundant first and second supply voltage sources.

In another advantageous embodiment of the invention, the second network is designed or configured to recognize an error in the first network, and to deactivate an output of the first network and/or perform error signaling when the error has been recognized in the first network. It is thus a simple matter to ensure that errors in the first network have no further effect without being recognized, for example, in a control unit which further processes an output signal from the electronic apparatus.

By way of example, the error in the first or second network may be an overvoltage at the output of the respective supply voltage source.

Corresponding advantages are obtained when the first network is designed or configured to recognize an error in the second network, deactivate an output of the first network and/or perform error signaling when an error has been recognized in the second network.

BRIEF DESCRIPTION OF THE DRAWINGS

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures and procedures described herein.

The single FIGURE shows a detailed schematic drawing of the electronic apparatus in accordance with the invention.

DETAILED DESCRIPTION OF THE PRESENTLY PREFERRED EMBODIMENTS

The single FIGURE shows an electronic apparatus with a supply potential input 1 and a reference-ground potential input 2. For use in a motor vehicle, the supply potential input 1 is preferably coupled to an onboard power supply in the motor vehicle and hence to a potential of 12, 14 or else 24 or 48 volts, for example.

The electronic apparatus comprises a first network 4 and a second network 6, the FIGURE showing the dividing line between the first and second networks 4, 6 by a dashed line. The first network 4 comprises a first microcontroller 8, which is preferably in the form of what is known as a host microcontroller. The first microcontroller 8 is electrically conductively connected to a first supply voltage source 10 in the first network 4 and is thus powered thereby. The first supply voltage source 10 also preferably comprises a low voltage recognition unit 12 and a reset unit 14. The low voltage recognition unit 12 is designed to recognize a prescribed drop below a prescribed voltage threshold value and to produce a corresponding signaling signal when the prescribed drop below a prescribed voltage threshold value has been recognized. The first microcontroller is coupled both to the low voltage recognition unit 12 and to the reset unit 14. The reset unit 14 is designed to produce a reset signal to reset the first microcontroller 8.

In addition, the first network 4 comprises a first ASIC 16 with a first sensor element 18, and preferably a third microcontroller and a communication interface, such as an SPI interface. By way of example, the first sensor element 18 is in the micromechanical form of a rotation rate sensor. Preferably, a clock generator 20 is also provided which is associated with the first ASIC 16.

In addition, a further clock generator 26 is preferably provided which is associated with the first microcontroller 8.

The first network 4 also comprises acceleration sensors 22, 24, which are designed to detect a lengthways (longitudinal) or transverse (latitudinal) acceleration in the motor vehicle, for example.

Furthermore, the first network 4 also has an associated interface driver 52 which is designed to produce signals which are transmitted via a bus, for example, such as a CAN bus. For this purpose, the electronic apparatus also comprises an output 54. As a result, the electronic apparatus is allowed to communicate with a control unit, for example, such as a vehicle dynamics control system control unit, and to supply it with information about a present transverse or latitudinal acceleration, a present lengthways or longitudinal acceleration or else a present rotation rate around a vertical axis of the vehicle.

The acceleration sensors 22, 24 are preferably electrically conductively connected to the first microcontroller 8 by appropriate analog inputs. The first ASIC 16 is preferably connected by its SPI interface to a corresponding SPI interface of the first microcontroller.

The second network 6 comprises a second supply voltage source 30. The first and also the second supply voltage source 10, 30 are designed to produce a supply voltage which is prescribed for the respective network 4, 6, for example, five volts.

The second network also comprises a second microcontroller 32, which is integrated in a second ASIC 34. The second ASIC 34 preferably also comprises a second sensor element 36, which is preferably likewise in the form of a rotation rate sensor. Furthermore, the second ASIC 34 comprises another communication interface, for example the SPI interface, which it can use to communicate with the first or third microcontroller. The second microcontroller 32 is preferably designed to process the measurement signal from the second sensor element 36 and to perform diagnosis and/or monitoring functions. The second ASIC 34 also has yet another clock generator 38 associated with it. Furthermore, the second network 6 may also comprise a further acceleration sensor 40, for example a further acceleration sensor for detecting the transverse or latitudinal acceleration.

To decouple interfering influences between the first network 4 and the second network 6 from each other, such as overvoltages, decoupling element 42, 44, 46, 48, 49, 50 are provided which are preferably in the form of electrical resistors. However, particularly in the case of dynamic signals, they may also be in the form of capacitors, for example, or may bring about decoupling in another manner which is known to a person skilled in the art, such as if they are in the form of optocouplers. The decoupling elements 42, 44, 46, 48, 49, 50 are designed such that they cause adequate decoupling of two networks 4, 6 in the event of the maximum interfering influences occurring, so as to ensure that the respective other network is not critically influenced by interfering influences from the respective other network. By way of example, the interfering influences are overvoltages which can be caused by a fault in the first or second supply voltage source 10, 30.

Thus, the decoupling elements 42 to 50 in the form of resistors are preferably in a form such that a maximum current flowing through them at a maximum voltage applied in the respective other network can be compensated for by the respective correctly operating supply voltage source 10, 30 by virtue of the current it supplies being withdrawn as appropriate. The resistance values of the decoupling elements 42 to 50 in the form of resistors are preferably ascertained by simulations or other calculations. In this way, an overvoltage, caused by a fault in one of the supply voltage sources 10, 30, can be restricted to the respective network 4, 6. If the first network is affected by such an overvoltage, the second network 6 continues to be protected from the overvoltage and, hence operable without restriction. Conversely, if the second network is affected by the overvoltage, the first network 4 continues to be protected from the overvoltage and, hence, operable without restriction.

Preferably, the second microcontroller 32 is also designed to recognize such a fault, for example by detecting the supply voltage for the first network or else by rendering measurement or output signals from the first network 4 plausible. Thus, by way of example, a measurement signal which is transmitted to the second microcontroller 32 via the SPI interface and which has been produced in the first ASIC 16 can be compared with a corresponding measurement signal, which is produced in the second ASIC 34, and rendered plausible. This allows the second microcontroller 32 to draw conclusions about faults in the first network.

When the second microcontroller has recognized an error in the first network 4, it is possible for the second microcontroller 32 to prevent further sending of information through the interface driver 52, initiated by the first microcontroller 8, for example. To this end, the second microcontroller 32 is preferably electrically conductively connected to an output stage 51 and thus actuates the base of a transistor, for example, by a further decoupling element 49 in the form of a resistor such that further signal transfer from the second microcontroller 32 to the interface driver 52 is prevented. As a result, it becomes possible to ensure that no erroneous information, for example, information about the rotation rate or the lengthways or transverse acceleration, is transmitted via the CAN bus to other control units, such as the vehicle dynamics control system control unit. The second ASIC 34 may also be electrically coupled to an input of the first microcontroller 8 via yet another decoupling element 50. Alternatively or in addition, the second microcontroller 32 may also be designed to perform error signaling when an error is recognized on the first network, for example, so as to inform other control units about the error in the first network 4.

The first microcontroller 8 is designed to detect the present supply voltage in the second network 6. To this end, the second network 6 preferably contains a voltage divider which is electrically coupled to an analog input of the first microcontroller 8 by the coupling element 46. Furthermore, a fault caused by an overvoltage in the second network 6 can be recognized by rendering plausible the measurement signals from the transverse acceleration sensors which are associated with the first and the second network 4, 6. This is based on the fact that the measurement signals from the acceleration sensors 22, 24, 40 are typically ratiometric in nature, that is to say that their signal level for the same acceleration is dependent on the respective supply voltage.

Alternatively, the fault in the second network 6 may also be recognized by the first microcontroller 8 by rendering plausible the measurement signals from the first and second sensor elements 18, 36 together. The first microcontroller is preferably designed preferably to perform error signaling following recognition of the error in the second network 6, specifically to preferably communicate appropriate error signaling to the control unit so as to change to emergency operation if appropriate, or else to output appropriate warning signals to a driver of a vehicle and if appropriate to deactivate the vehicle dynamics control system for safety reasons. Alternatively or in addition, however, the first microcontroller 8 may also be designed to deactivate an appropriate output of the second network 6 when an error is recognized in the second network 6.

The second supply voltage source 30 regularly needs to be produced in the form of the first voltage source 10 just for a low power requirement in the second network 6. This means that it is possible for the second voltage source 30 to be of particularly simple design, for example, a simple inphase regulator. Through the provision of such first and second supply voltage sources 10, 30, it is possible to ensure firstly, even at very high voltages in one network 4, 6, that the other network 4, 6 continues to be supplied with the desired supply voltage by its respective associated supply voltage source 10, 30 and secondly that achieving the protective action does not require any components which raise a lower operating voltage limit, which is advantageous particularly when an internal combustion engine in the motor vehicle starts. Such components are voltage limiting elements, for example, such as zener diodes, which have a relevant voltage drop.

Alternatively, the decoupling elements may also comprise capacitors, for example. Furthermore, the respective other microprocessor can also be monitored by prescribing test computation operations and evaluating the results delivered.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An electronic apparatus for use in a motor vehicle, comprising:
    a first network having a first microcontroller and a first supply voltage source; and
    a second network having a second microcontroller and a second supply voltage source; and
    a plurality of decoupling elements disposed between the first and second network, each of said plural decoupling elements being configured to decouple interfering influences between the first and second networks;
    wherein the second network is configured to recognize an error in the first network and at least one of deactivate an output of the first network and provide error signaling when the error in the first network has been recognized, and wherein the second microcontroller is integrated on a chip with a sensor element, the microcontroller being configured to process a measurement signal from the sensor element.

2. The electronic apparatus as claimed in claim 1, wherein the decoupling elements are resistors.

3. The electronic apparatus as claimed in claim 1, wherein the first network has a redundant sensor element which provides redundancy for the sensor element which is integrated with the second microcontroller on the chip.

4. The electronic apparatus as claimed in claim 3, wherein the first network is configured to recognize the error in the second network and to at least one of deactivate an output of the first network and provide error signaling when the error has been recognized on the second network.

5. The electronic apparatus as claimed in claim 1, wherein the first network is configured to recognize the error in the second network and to at least one of deactivate an output of the first network and provide error signaling when the error has been recognized on the second network.

* * * * *